United States Patent
Byron

(10) Patent No.: US 7,686,609 B2
(45) Date of Patent: Mar. 30, 2010

(54) APPARATUS FOR MOLDING PROPPANTS AND METHOD

(76) Inventor: Kent Byron, 314 School Board Dr., New Iberia, LA (US) 70560

( * ) Notice: Subject to any disclaimer, the term of this patent is extended or adjusted under 35 U.S.C. 154(b) by 448 days.

(21) Appl. No.: 11/726,866

(22) Filed: Mar. 23, 2007

(65) Prior Publication Data

US 2008/0230952 A1  Sep. 25, 2008

(51) Int. Cl.
*B29C 45/40* (2006.01)
(52) U.S. Cl. .................. 425/556; 425/444; 425/588
(58) Field of Classification Search ............... 425/542, 425/556, 577, 572, 567, 568, 588, DIG. 34, 425/444
See application file for complete search history.

(56) References Cited

U.S. PATENT DOCUMENTS

| | | | | |
|---|---|---|---|---|
| 2,226 A | * | 8/1841 | Dillaway | 65/305 |
| 174,365 A | * | 3/1876 | Jackson | 425/233 |
| 1,746,236 A | * | 2/1930 | Barton | 164/129 |
| 2,209,502 A | * | 7/1940 | Annich | 29/527.6 |
| 3,456,301 A | * | 7/1969 | Morroni | 425/567 |
| 3,819,312 A | | 6/1974 | Arpajian | |
| 4,460,537 A | | 7/1984 | Heinle | |
| 4,806,405 A | * | 2/1989 | Liebl | 428/52 |
| 5,055,025 A | * | 10/1991 | Muller | 425/144 |
| 5,513,689 A | * | 5/1996 | Montgomery et al. | 164/113 |
| 5,632,322 A | * | 5/1997 | Trickel et al. | 164/316 |
| 5,958,465 A | * | 9/1999 | Klemm et al. | 425/116 |
| 6,042,363 A | * | 3/2000 | Kikuchi | 425/556 |
| 6,533,792 B2 | * | 3/2003 | Menne et al. | 606/128 |
| 2003/0062167 A1 | | 4/2003 | Surjaatmadja et al. | |
| 2006/0243363 A1 | | 11/2006 | Hunter et al. | |
| 2008/0090940 A1 | * | 4/2008 | Epling | 523/128 |

* cited by examiner

*Primary Examiner*—Yogendra Gupta
*Assistant Examiner*—Emmanuel S Luk
(74) *Attorney, Agent, or Firm*—Jones Walker

(57) ABSTRACT

An apparatus for molding a proppant is disclosed. The apparatus comprises a first member comprising a manifold for channeling a plastic fluid to a cavity block, with the cavity block containing a plurality of semi-spherical cavities. The apparatus further includes a second member that comprises a movable plate for engaging with the first member, with the movable plate having an opening therein, and a core block positioned within the opening, with the core block containing a plurality of reciprocal semi-spherical cavities configured to engage the semi-spherical cavities of the cavity block so that a plurality of spheres are formed, with the core block further containing a plurality of arm cavities that link the plurality of spheres so that a star cluster (which links the proppants) is formed. A method of manufacturing proppants and a method of using the proppants is also disclosed.

13 Claims, 5 Drawing Sheets

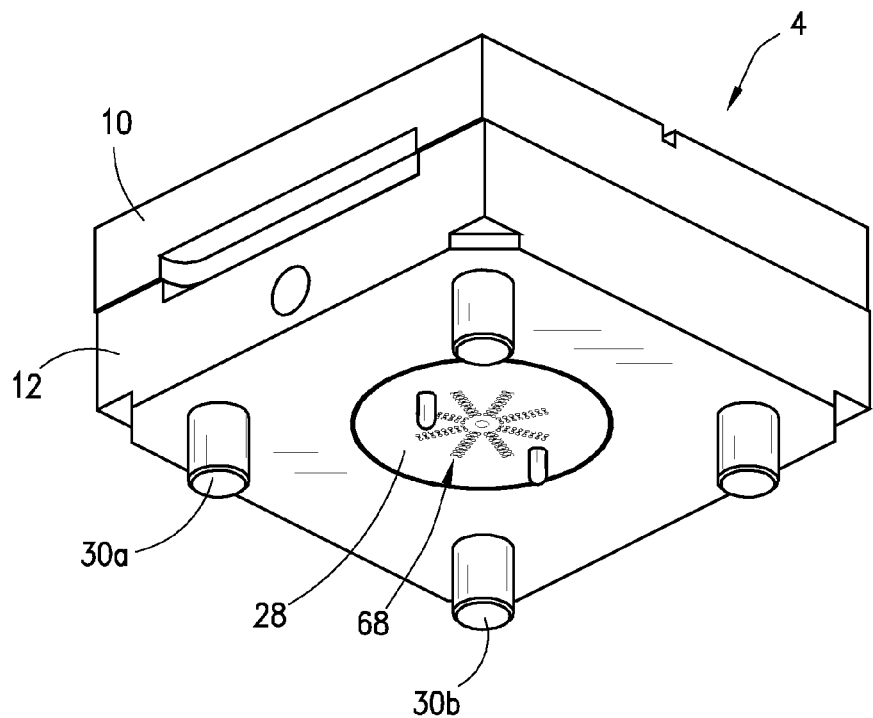
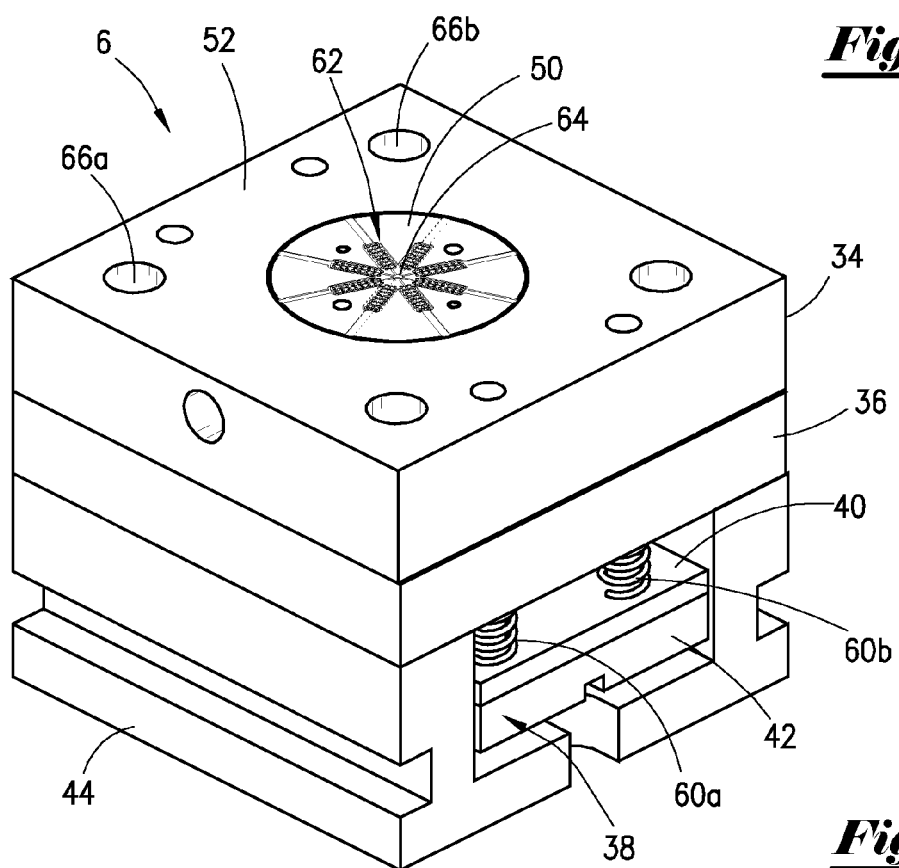

APPARATUS FOR MOLDING PROPPANTS AND METHOD

BACKGROUND OF THE INVENTION

This invention relates to an apparatus for molding proppants. More specifically, but without limitation, this invention relates to an apparatus for molding proppants, a method of manufacturing proppants and a method of using manufactured proppants. The apparatus will allow for mass production of the proppants and a method of using the proppant.

In the petroleum industry, it is necessary to fracture subterranean reservoirs. As those of ordinary skill in the art will appreciate, the subterranean reservoir may require fracturing in order to increase the permeability of the subterranean reservoir. In general, fracturing agents are spherical particles. Sand has been used as a prior art fracturing agents. Sand has a generally spherical shape, has a significant compressibility (i.e. difficult to crush), and is heat resistant.

Nevertheless, as those of ordinary skill in the art will appreciate, the uniformity of sand geometry can vary significantly. A uniform sand particle allows for a high flow rates; therefore, as the uniformity of the sand grain decreases, so does the permeability of the sand, which in turn negatively impacts other characteristics of the fracturing agent.

Items of many shapes, sizes and weights can be injected molded. Prior art devices and methods of injecting fluid plastic to mold articles are known in the art. For instance, see U.S. Pat. No. 7,007,445 entitled "Method of Making A Plurality of Interconnected Vials", which is incorporated herein by express reference.

However, prior art injection techniques have limited the ability of mold designers to manufacture proppants of suitable size and weight to be used in down hole applications including but not limited to fracturing and gravel packing of wells. For instance, prior art techniques do not allow for the production of spheres in significant quantities. Therefore, an object of the present invention is to manufacture proppants with uniform properties including concentricity, weight, and size. In other words, the manufactured proppants will all have the same properties which include uniform concentricity, weight, compressibility, specific gravity, heat resistance and size. Another object is that the proppants can be molded in large quantities. These objects as well as many others will become apparent from the following description.

SUMMARY OF THE INVENTION

An apparatus for molding a proppant is disclosed. The apparatus comprises a first member comprising a manifold for channeling a plastic fluid to a cavity block, with the cavity block containing a plurality of semi-spherical cavities. The apparatus further includes a second member that comprises a movable plate for engaging with the first member, with the movable plate having an opening therein, and a core block positioned within the opening, with the core block containing a plurality of reciprocal semi-spherical cavities configured to engage the semi-spherical cavities of the cavity block so that a plurality of spheres are formed, with the core block further containing a plurality of arm cavities that link the plurality of spheres so that a star cluster (which links the proppants) is formed. The plastic fluid within the plurality of spheres forms the proppant. The apparatus further comprises an ejector plate slidably disposed within the core block, a piston plate operatively attached to the ejector plate for advancing and contracting the ejector plate, and a first pin member, disposed through the ejector plate, for ejecting the star cluster from the core block.

The apparatus may further comprise a second pin member, disposed through the ejector plate, for ejecting the proppants from the star cluster. In one preferred embodiment, the second pin member includes a stop located on the second pin member so that the proppant is removed from the star cluster. Also, in the preferred embodiment, the manifold feeds the plastic fluid to a center gate of the cavity block, with the cavity block including a plurality of channel arrays radiating from the center gate, each array having a plurality of rows and each row having a pair of sphere gates that deliver the plastic fluid to the semi-spherical cavities so that injection of the plastic fluid is directed into the plurality of spheres.

Also in the preferred embodiment, the first member further comprises a heating means for heating the plastic fluid, and wherein the heating means may include a hot sprue bushing for delivering the plastic fluid to the manifold. The plurality of channel array, in the preferred embodiment, includes at least seven (7) channels and wherein the plurality of rows includes at least eight (8) rows so that the plurality of proppants are formed.

A method of molding a plurality of proppants is also disclosed. The method includes providing an apparatus for molding the proppants. The apparatus comprises a first member having a manifold for channeling a plastic fluid to a cavity block, with the cavity block containing a plurality of semi-spherical cavities, a center gate that is fluidly communicated with a plurality of channel arrays radiating outward from the center gate, and wherein each plurality of channel arrays having a plurality of rows, and wherein each row has a pair of proppant gates that deliver the plastic fluid to the semi-spherical cavities. The apparatus also includes a second member comprising a movable plate for engaging with the first member, with the movable plate having an opening therein, and a core block positioned within the opening, with the core block containing a plurality of reciprocal semi-spherical cavities configured to engage the semi-spherical cavities of the cavity block so that a plurality of spheres are formed. The core block further contains a plurality of arm cavities that link said plurality of spheres so that a star cluster of proppants is formed, and wherein the injected plastic fluid within the plurality of spheres forms the proppants. The apparatus further includes an ejector plate disposed within the core block, a piston plate operatively attached to the ejector plate for advancing and contracting the ejector plate, and a first pin member for ejecting the star cluster from the core block.

The method further includes closing the first member and the second member and forming a plurality of spheres linked by the star cluster. Next, the fluid plastic is injected into the center gate and then the fluid plastic is injected into the proppant gates. The method then includes forming the plurality of proppants linked to the star cluster. The method then includes opening the first member and second member and ejecting the star clusters with the linked proppants with a first pin member.

In another preferred embodiment, the method comprises opening the first member and the second member, ejecting the proppants with a second pin member, and then ejecting the star cluster.

As per the teachings of the present disclosure, the method may include pumping the proppants into a subterranean well, with the subterranean well intersecting a hydrocarbon bearing reservoir. The method includes pumping the proppants into the hydrocarbon bearing reservoir. The method further includes forcing the proppants into the hydrocarbon bearing reservoir and fracturing the hydrocarbon reservoir with the proppants.

In another preferred embodiment, the method may comprise pumping the proppants into a subterranean well, wherein the subterranean well intersects a hydrocarbon bearing reservoir, with the subterranean well having a gravel pack screen concentrically disposed within the subterranean well, and wherein the gravel pack screen is adjacent the hydrocarbon bearing reservoir and forming an annulus. The method includes pumping the proppants into the annulus formed between the gravel pack screen and the subterranean well.

An advantage of the present invention includes the ability to mass produce the proppants. Another advantage is the concentricity and uniformity of the sphere. Yet another advantage is the physical properties of the molded proppants are superior to the prior art proppants. For instance, the specific gravity, compressibility, and heat resistance of the molded proppant is far superior than prior art proppants characteristics.

Another advantage is that the molded proppants have very small diameters. Another advantage is the uniformity of the physical properties of the proppants i.e. all proppants have uniform physical properties. Still yet another advantage is that the proppants may be used for fracturing subterranean wells wherein the proppants may be forced into openings within the reservoir rock so that the reservoir rock is fractured. Yet another advantage is that the proppants may be used in production and completion operations for controlling sand production from subterranean reservoir.

A feature of the present invention is that the semi-spherical cavities are located on the cavity block face and the reciprocal semi-spherical cavities are located on the core block face. Another feature is that the semi-spherical cavities on the core block face are linked so that a star cluster pattern is formed. Another feature is the use of an ejector pin member for ejecting the star cluster from the core block. Yet another feature is the use of an ejector pin member for ejecting the proppants from the star cluster. Still yet another feature is that the disclosure also allows for robotic removal of proppants from the star cluster.

BRIEF DESCRIPTION OF THE DRAWINGS

FIG. 2A is a schematic view of the core side of the mold apparatus.

FIG. 2B is a partial schematic view of the cavity side of the mold apparatus.

DETAILED DESCRIPTION OF THE PREFERRED EMBODIMENTS

Figure 1:
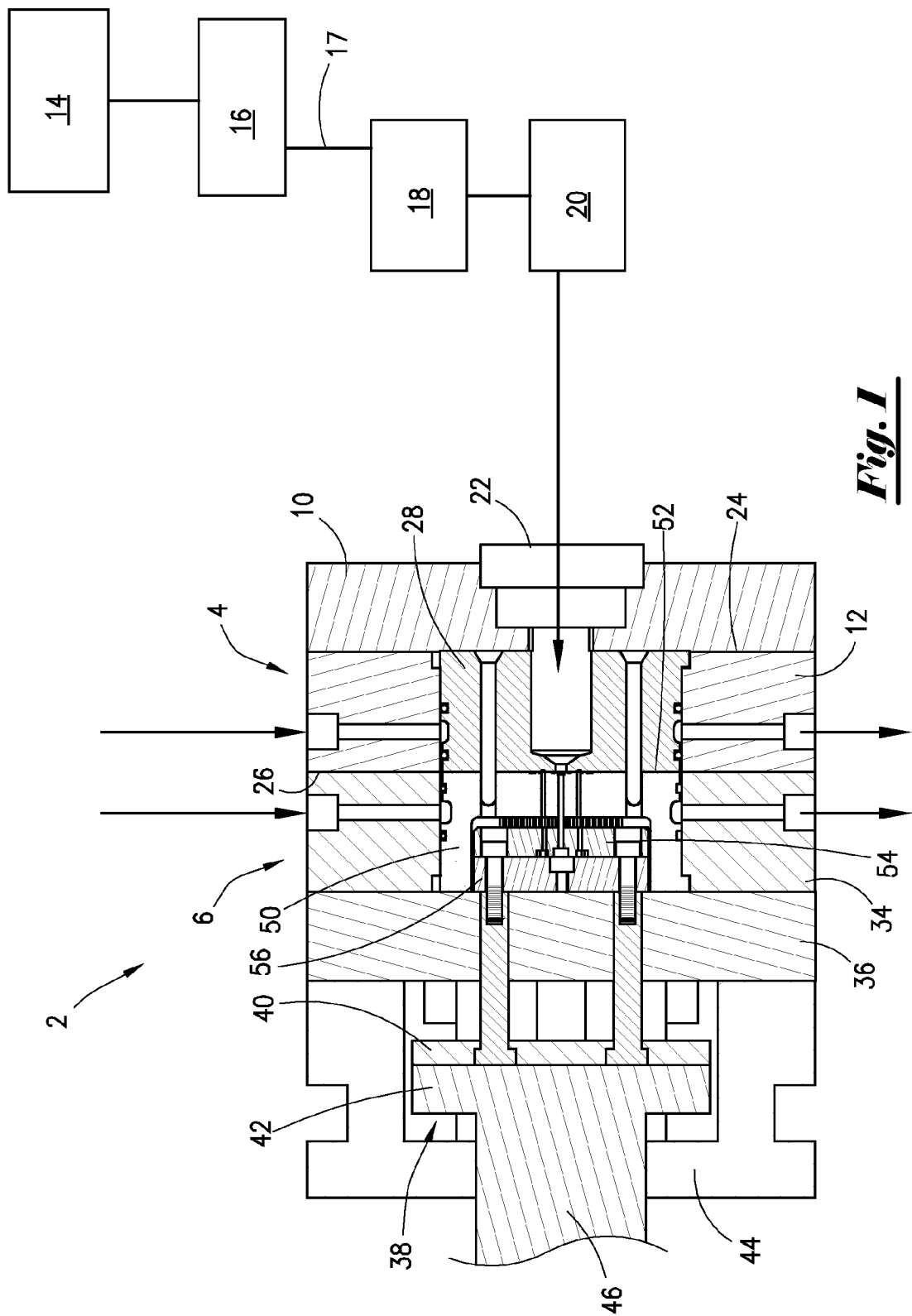
FIG. 1 is a cross-sectional view of one of the preferred embodiments of the mold apparatus of the present disclosure.

Referring now to FIG. 1, a schematic view of one of the preferred embodiments of the mold apparatus 2 of the present disclosure will now be described. The apparatus 2 includes a cavity member 4 and a core member 6. The cavity member 4 includes the base plate that is operatively attached to the first cavity plate 10 which in turn is operatively attached to the second cavity plate 12. The apparatus 2 includes a plastic supply 14 that is connected to a heater bin 16 for fluidizing the plastic supply as readily understood by those of ordinary skill in the art. The plastic supply used in the most preferred embodiment will be a resin commercially available from several vendors. The plastic fluid is then fed through a manifold 17 and into the heating means 18 for heating and maintaining the fluid plastic at the proper temperature, and wherein the heating means 18 is controlled by a controller means 20 for sensing the temperature of fluid plastic and generating a signal to maintain the temperature at a preset desired level, as readily understood by those of ordinary skill in the art. Controllers are commercially available from American MSI Corporation under the name 38 Zone Delta. The heating means 18 delivers the fluid plastic to the hot sprue bushing 22.

The second cavity plate 12 contains a first face 24 and a second face 26, and wherein the first face 24 contains an opening that has positioned therein the cavity block 28. The cavity block 28 receives the fluid plastic from the hot sprue bushing 22, and wherein the cavity block contains internal channels that in turn deliver the fluid plastic to the second face 26 via proppant gates. In particular, the second face 26 will contain a plurality of semi-spherical cavities. FIG. 2B also shows the post 30a, 30b.

Returning to FIG. 1, the core member 6 comprises an end face plate 34 that is operatively attached to the clamp plate 36. The core member 6 is operatively attached to a movable mandrel, seen generally at 38, which includes the top mandrel 40 and the bottom mandrel 42. The movable mandrel 38 is operatively attached to the bottom face plate 44 of the core member 6. The piston means 46 will be operatively attached to the movable mandrel 38 so that the piston means 46 imparts selectively longitudinal movement to said moveable mandrel 38.

The end face plate 34 contains an opening, and wherein the core block 50 is positioned therein. The core block 50 includes an end face 52 that contains semi-spherical cavities that are configured to engage with the semi-spherical cavities of the cavity block 28, and wherein the cavities cooperate to form spheres which will contain the fluid plastic which in turn forms the plurality of proppants. The core block 50 has operatively associated therewith a first ejector plate 54 which in turn is operatively attached to a second ejector plate 56.

Referring now to FIG. 2A, a schematic view of the core member 6 of the mold apparatus 2 will be further described. FIG. 2A depicts the end face 52 that has disposed therein the core block 50. The moveable mandrel 38 is shown, and as mentioned earlier, the moveable mandrel 38 contains the top mandrel 40 and the bottom mandrel 42. FIG. 2A depicts the coiled spring 60a, 60b that bias the movable mandrel 38 relative to the end face plate 34, clamp plate 36 and the bottom face plate 44. The semi-spherical cavity pattern is also depicted in FIG. 2A. More specifically, the core block 50 contains the plurality of semi-spherical cavities, seen generally at 62, and wherein the semi-spherical cavities on the core block are reciprocal to the semi-spherical cavities on the cavity block 28. As seen in FIG. 2A, semi-spherical cavities extend radially outward from a center 64. In the most preferred embodiment, there are eight (8) rows extending radially outward, and each row has pairs of cavities so that proppants will be formed when the apparatus 2 is molding. As per the teachings of the present disclosure, once molded, a runner having a star cluster pattern with attached proppants will be formed (hereinafter "star cluster"). Also shown are the openings for the post 30a, 30b, for instance openings 66a, 66b.

Referring now to FIG. 2B, a partial schematic view of the cavity member 4 of the mold apparatus 2 will now be described. FIG. 2B depicts the first cavity plate 10 that is operatively attached to the second cavity plate 12, and wherein the cavity block 28 is disposed within the second cavity plate 12. The cavity block 28, as previously mentioned, has a plurality of semi-spherical cavities that are operatively associated with the proppants gates that deliver fluid plastic to the semi-spherical cavities. The plurality of semi-spherical cavities, seen generally at 68, are reciprocal to the semi-spherical cavities 62 of the core block 50.

Figure 3:
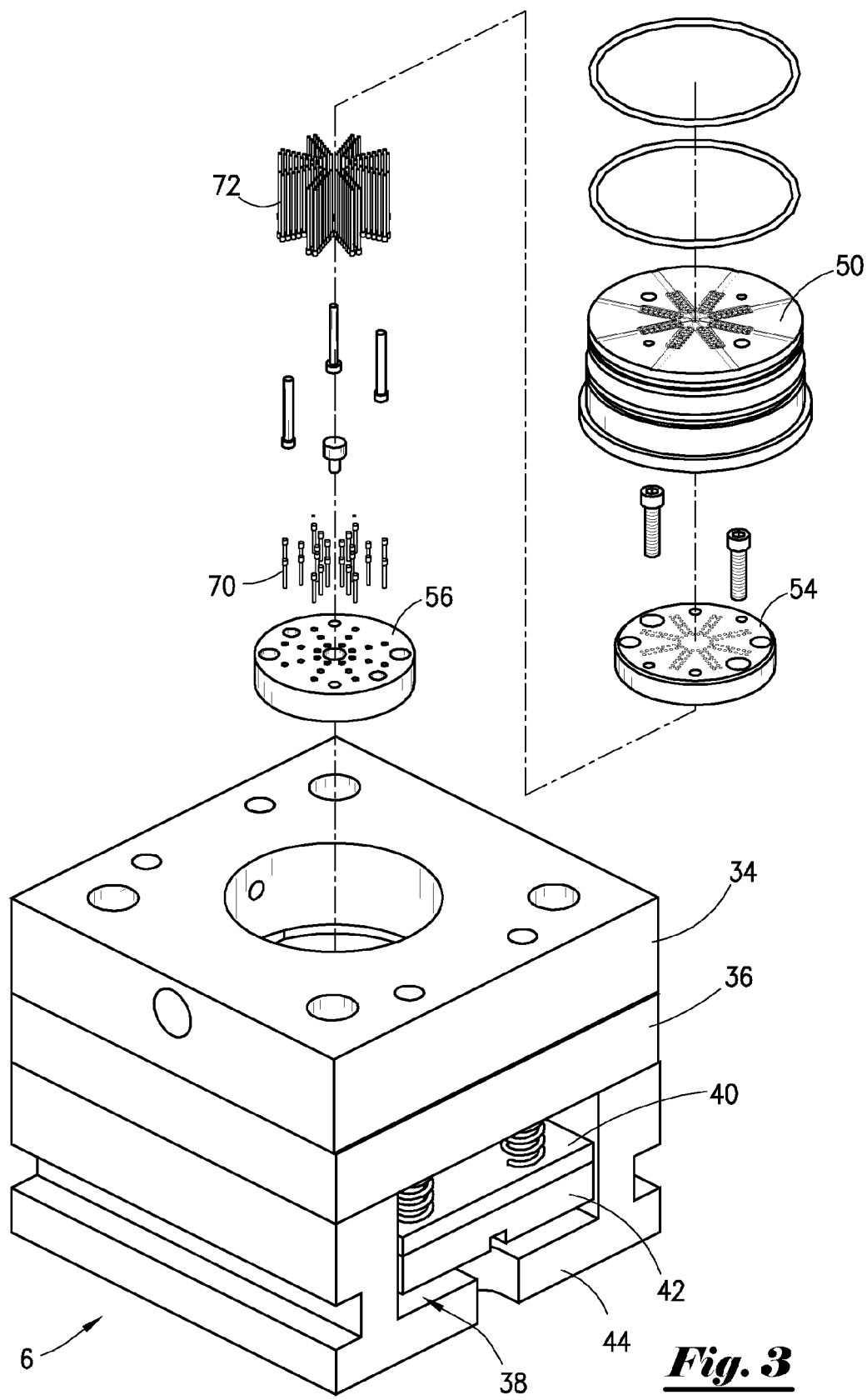
FIG. 3 is an exploded view of the core member seen in FIG. 2A.

FIG. 3 is an exploded view of the core member seen in FIG. 2A. FIG. 3 depicts the core block 50, the first ejector plate 54 and the second ejector plate 56. The first pin means 70 for ejecting the star cluster is shown along with the second pin means 72 for ejecting the proppants from the star cluster is shown. It should be noted that it would be possible to de-gate (remove) the proppants with a robotic device, and wherein the robotic device would be separate from the core member 6. The robotic device is not shown.

Figure 4:
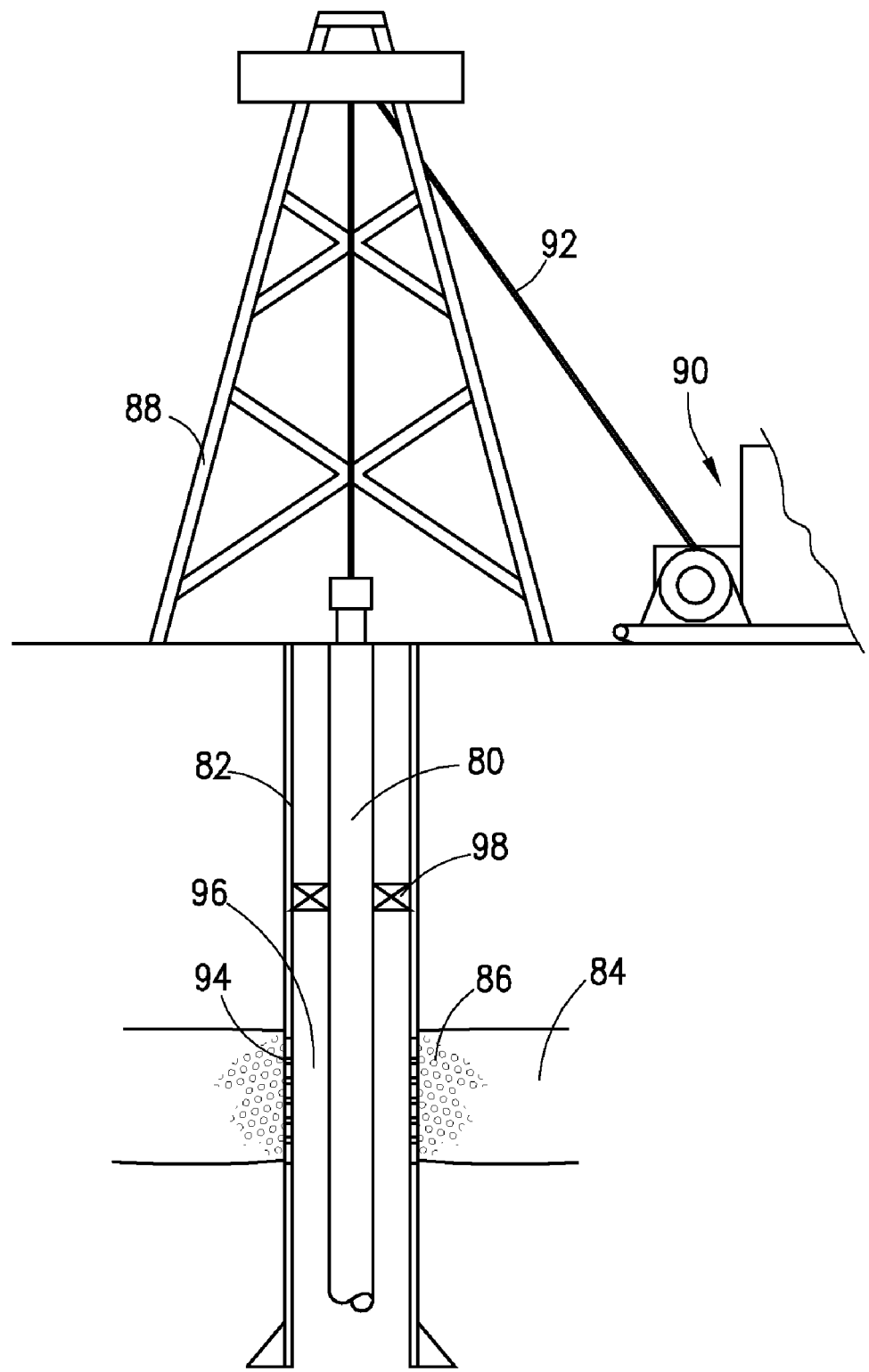
FIG. 4 is a schematic illustration of a tubular string concentrically disposed within a wellbore intersecting a subterranean reservoir, with proppants placed in the reservoir.

Referring now to FIG. 4, a schematic illustration of a tubular string 80 concentrically disposed within a wellbore 82 intersecting a subterranean reservoir 84, with the proppant having been pumped into the reservoir 84. The proppant is generally seen at 86. As shown, a drilling rig 88 is operatively associated with the wellbore 82. As understood by those of ordinary skill in the art, a coiled tubing unit 90 is operatively associated with the rig 88, and wherein the coiled tubing 92 is concentrically placed within the tubular string 80 and lowered to a desired depth. The perforations 94 in the wellbore 82 communicate the reservoir 84 with the annulus area 96. A packer means 98 for sealing is also included. In one preferred embodiment, the coiling tubing 92 is used to deliver the proppants 86. As seen in FIG. 4, the proppants 86 will be pumped into the reservoir 84 via the coiled tubing unit 90, so that the proppants 86 fracture the reservoir formation rock thereby increasing permeability, as readily understood by those of ordinary skill in the art.

Figure 5:
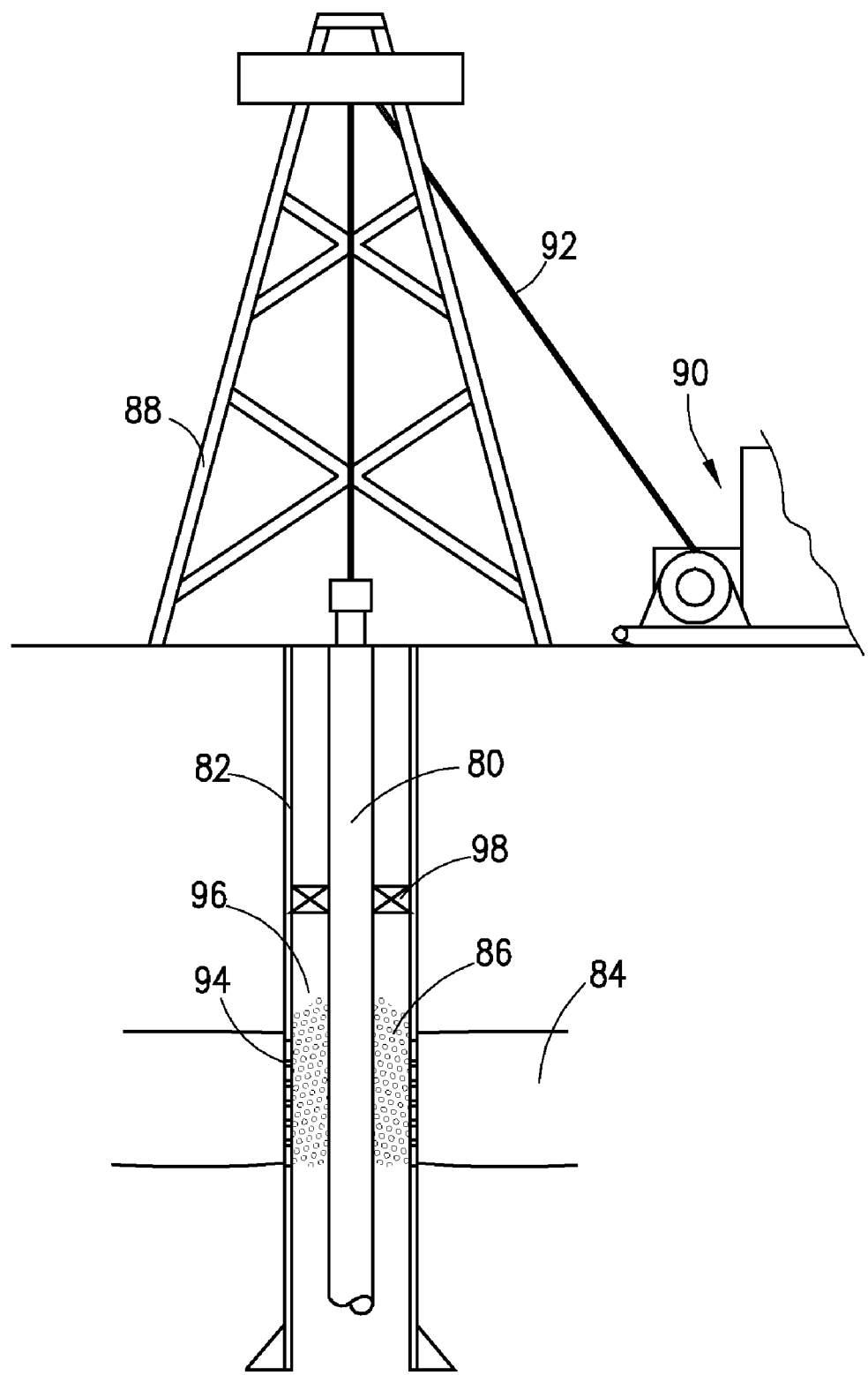
FIG. 5 is a schematic illustration of a tubular string concentrically disposed within a wellbore intersecting a subterranean reservoir, with proppants placed in the wellbore annulus.

In a second embodiment, the proppants can be used for gravel packing the well. FIG. 5 is a schematic illustration of the tubular string 80 concentrically disposed within the wellbore 82, wherein the wellbore 82 intersects a subterranean reservoir 84, with the proppant 86 having been pumped into the wellbore annulus 96. Among other reasons, the gravel pack procedure allows the compaction of the proppant spheres in the annulus area 96 in order to prevent sand production that may occur during production of the reservoir 84, as understood by those of ordinary skill in the art. Production from the reservoir 84 is through the perforations 94, through the gravel pack (proppants 86), through a gravel pack screen, up through the tubular 80, and to the surface.

Changes and modifications in the specifically described embodiments can be carried out without departing from the scope of the invention which is intended to be limited only by the scope of the appended claims and any equivalents thereof.

I claim:

1. An apparatus for molding a plurality of proppants comprising:
a first member comprising a manifold for channeling a plastic fluid to a cavity block, said cavity block containing a plurality of semi-spherical cavities;
a second member comprising:
a movable plate for engaging with said first member, said movable plate having an opening therein;
a core block positioned within said opening, said core block containing a plurality of reciprocal semi-spherical cavities configured to engage the semi-spherical cavities of said cavity block so that a plurality of spheres are formed, said core block further containing a plurality of arm cavities that link said plurality of spheres and wherein said plastic fluid within said plurality of arm cavities forms a star cluster and within said plurality of spheres forms the proppants;
an ejector plate assembly slidably disposed within said core block, said ejector plate assembly comprising:
a first ejector plate;
a second ejector plate operatively attached to said first ejector plate;
a piston plate operatively attached to said ejector plate assembly for advancing and contracting said ejector plate assembly;
a plurality of first ejector pins disposed through said first ejector plate for ejecting said star cluster with said proppants from said core block, said plurality of first ejector pins operatively attached to said first ejector plate;
a plurality of second ejector pins disposed through said second ejector plate for ejecting said proppants without said star cluster, said plurality of second ejector pins operatively attached to said second ejector plate.

2. The apparatus of claim 1 wherein each of said second ejector pins includes a stop located thereon so that the proppants are removed from said star cluster.

3. The apparatus of claim 1 wherein said manifold feeds the plastic fluid to a center gate of said cavity block, said cavity block including a plurality of channel arrays radiating from said center gate, each array having a plurality of rows, each row having a pair of sphere gates that deliver said plastic fluid to said semi-spherical cavities so that injection of the plastic fluid is directed into said plurality of spheres.

4. The apparatus of claim 3 wherein said first member further comprises a heating means for heating said plastic fluid.

5. The apparatus of claim 4 wherein said heating means further includes a hot sprue bushing for delivering the plastic fluid to said manifold.

6. The apparatus of claim 5 wherein said plurality of channel arrays includes at least seven (7) channels.

7. The apparatus of claim 6 wherein said plurality of rows includes at least eight (8) rows so that the plurality of proppants are formed.

8. A device for manufacturing a plurality of proppants comprising:
a first member having a manifold for channeling a plastic fluid to a cavity block, said cavity block containing a plurality of semi-spherical cavities, a center gate that is fluidly communicated with a plurality of channel arrays radiating outward from said center gate, and wherein each plurality of channel arrays has a plurality of rows, and wherein each row has a pair of gates that deliver said plastic fluid to said semi-spherical cavity;
a second member comprising:
a movable plate for engaging with said first member, said movable plate having an opening therein;
a core block positioned within said opening, said core block containing a plurality of reciprocal semi-spherical cavities configured to engage the semi-spherical cavities of said cavity block so that a plurality of spheres are formed, said core block further containing a plurality of arm cavities that link said plurality of spheres, and wherein said plastic fluid within said plurality of arm cavities forms a star cluster and within said plurality of spheres forms the proppants;

an ejector plate assembly disposed within said core block, said ejector plate assembly comprising:

a first ejector plate;

a second ejector plate operatively attached to said first ejector plate;

a piston plate operatively attached to said first and second ejector plates for advancing and contracting said first and second ejector plates;

a plurality of first ejector pins disposed through said first ejector plate for ejecting said star cluster with said proppants from said core block, said plurality of first ejector pins operatively attached to said first ejector plate;

a plurality of second ejector pins disposed through said second ejector plate for ejecting said proppants without said star cluster, said plurality of second ejector pins operatively attached to said second ejector plate.

9. The device of claim 8 wherein each of said second ejector pins includes a stop located thereon so that the proppants are removed from said star cluster.

10. The device of claim 9 wherein said first member contains a heating means for heating said plastic fluid.

11. The device of claim 10 wherein said heating means further includes a hot sprue bushing for delivering the plastic fluid to said manifold.

12. The device of claim 11 wherein said plurality of channel arrays includes seven (7) channels.

13. The device of claim 12 wherein said plurality of rows includes eight (8) rows so that the plurality of proppants are formed.

* * * * *